United States Patent
VanBlon et al.

(10) Patent No.: US 12,001,528 B2
(45) Date of Patent: Jun. 4, 2024

(54) AUTHENTICATION POLICY FOR EDITING INPUTS TO USER-CREATED CONTENT

(71) Applicant: Lenovo (Singapore) Pte. Ltd., Singapore (SG)

(72) Inventors: Russell Speight VanBlon, Raleigh, IN (US); Scott Li, Cary, NC (US); Robert J Kapinos, Durham, NC (US); Robert James Norton, Jr., Raleigh, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 239 days.

(21) Appl. No.: 17/351,871

(22) Filed: Jun. 18, 2021

(65) Prior Publication Data

US 2022/0405356 A1 Dec. 22, 2022

(51) Int. Cl.
*G06F 21/31* (2013.01)

(52) U.S. Cl.
CPC ..................... *G06F 21/31* (2013.01)

(58) Field of Classification Search
CPC ...................................................... G06F 21/31
See application file for complete search history.

(56) References Cited

U.S. PATENT DOCUMENTS

| | | | |
|---|---|---|---|
| 8,468,351 B2* | 6/2013 | Boesgaard Sorensen | G06F 21/554 713/168 |
| 9,430,629 B1* | 8/2016 | Ziraknejad | G06F 16/583 |
| 9,684,775 B2* | 6/2017 | Gupta | H04L 63/1433 |
| 9,807,073 B1* | 10/2017 | Miller | G06F 21/6218 |
| 11,159,520 B1* | 10/2021 | Rao | G06F 21/316 |
| 11,310,228 B1* | 4/2022 | Rao | G06V 10/22 |
| 11,503,035 B2* | 11/2022 | Dasgupta | H04L 63/104 |
| 11,546,327 B2* | 1/2023 | Dashevskiy | H04L 63/0861 |
| 2011/0314558 A1* | 12/2011 | Song | G06F 21/316 726/28 |
| 2014/0096178 A1* | 4/2014 | Shippy | G06F 21/316 726/1 |
| 2016/0110528 A1* | 4/2016 | Gupta | H04L 63/08 726/19 |
| 2017/0046507 A1* | 2/2017 | Archer | H04W 12/02 |
| 2018/0131692 A1* | 5/2018 | Katz-Oz | G06F 21/32 |
| 2019/0312881 A1* | 10/2019 | Dasgupta | H04L 63/104 |
| 2019/0342298 A1* | 11/2019 | Chen | H04L 9/3231 |
| 2020/0014702 A1* | 1/2020 | Dasgupta | G06F 21/45 |
| 2020/0389491 A1* | 12/2020 | Buck | G06F 21/88 |

(Continued)

OTHER PUBLICATIONS

Yang Y, Guo B, Wang Z, Li M, Yu Z, Zhou X. BehaveSense: Continuous authentication for security-sensitive mobile apps using behavioral biometrics. Ad Hoc Networks. Mar. 1, 2019;84:9-18. (Year: 2019).*

*Primary Examiner* — James R Turchen

(74) *Attorney, Agent, or Firm* — Ference & Associates LLC

(57) ABSTRACT

One embodiment provides a method, including: identifying, at an information handling device, a sensitivity level associated with user-created content; detecting editing input provided to the user-created content by a user; determining, using a processor, a type of continuous authentication policy to implement for the user-created content based upon the sensitivity level; and authenticating the user providing the editing input at a frequency dictated by the type of the continuous authentication policy. Other aspects are described and claimed.

18 Claims, 3 Drawing Sheets

(56) References Cited

U.S. PATENT DOCUMENTS

2021/0194883 A1* 6/2021 Badhwar ............... H04L 63/107
2021/0226944 A1* 7/2021 Michaud ............. H04L 63/0807
2022/0156351 A1* 5/2022 Gelardi ................ H04W 12/68
2022/0321602 A1* 10/2022 Szigeti .................... G06F 21/31

* cited by examiner

AUTHENTICATION POLICY FOR EDITING INPUTS TO USER-CREATED CONTENT

BACKGROUND

Information handling devices ("devices"), for example, smart phones, tablets, wearable devices, laptop and/or desktop computers, hybrid devices, and the like, contain a variety of different applications. For example, many devices may contain various types of content creation applications (e.g., a word processing application, a presentation application, a spreadsheet application, etc.) that enable users to create documents and/or files. This user-created content may subsequently be viewed and/or edited by the original user or other individuals.

BRIEF SUMMARY

In summary, one aspect provides a method, including: identifying, at an information handling device, a sensitivity level associated with user-created content; detecting editing input provided to the user-created content by a user; determining, using a processor, a type of continuous authentication policy to implement for the user-created content based upon the sensitivity level; and authenticating the user providing the editing input at a frequency dictated by the type of the continuous authentication policy.

Another aspect provides an information handling device, including: a processor; a memory device that stores instructions executable by the processor to: identify a sensitivity level associated with user-created content; detect editing input provided to the user-created content by a user; determine a type of continuation authentication policy to implement for the user-created content based upon the sensitivity level; and authenticate the user providing the editing input at a frequency dictated by the type of the continuous authentication policy.

A further aspect provides a product, including: a storage device that stores code, the code being executable by a processor and comprising: code that identifies a sensitivity level associated with user-created content; code that detects editing input provided to the user-created content by a user; code that determines a type of continuous authentication policy to implement for the user-created content based upon the sensitivity level; and code that authenticates the user providing the editing input at a frequency dictated by the type of the continuous authentication policy.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
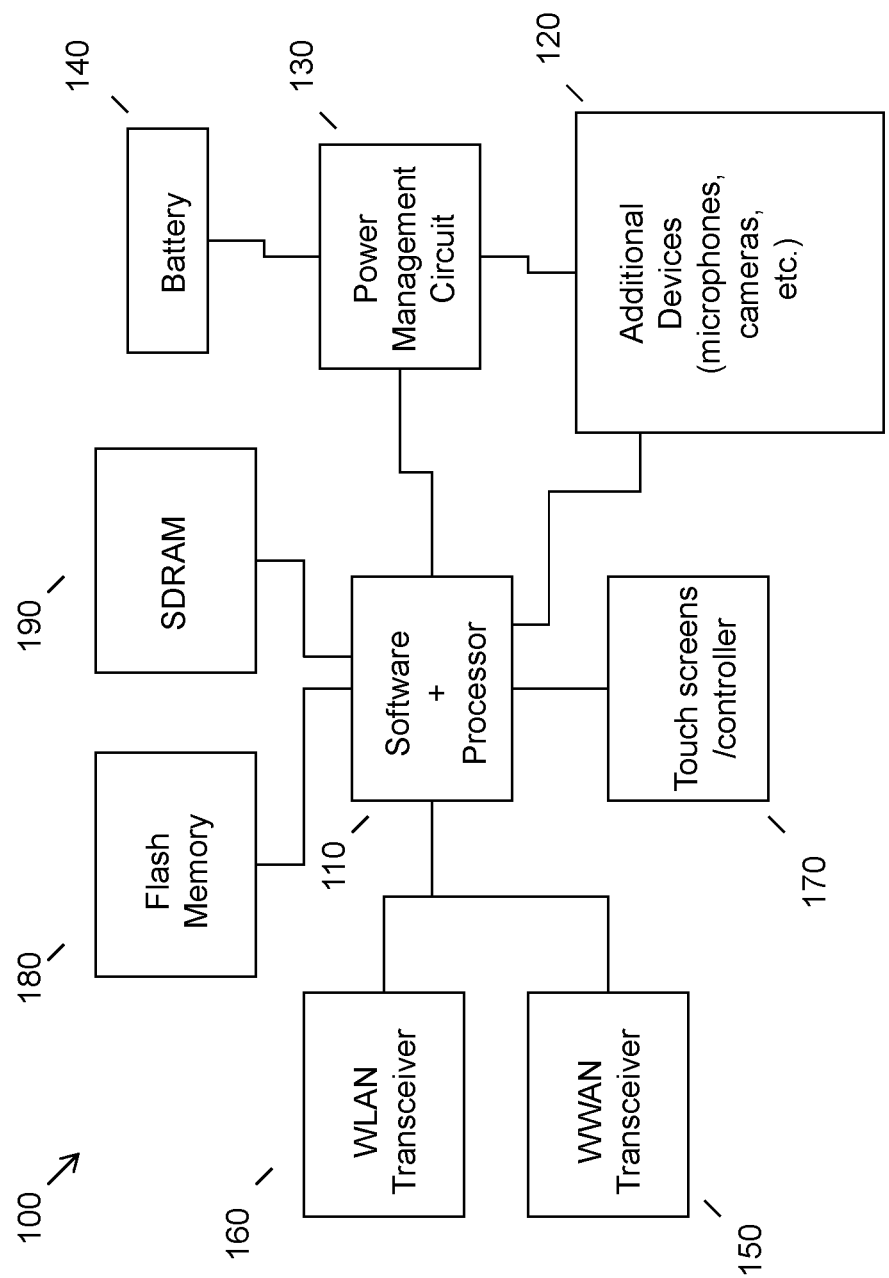
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Situations arise where an administrative user may desire to empower only a limited number of individuals with editing controls for a particular article of user-created content (e.g., a document, a file, etc.). Although techniques exist that may apprise the administrative user that an article of content was edited, when it was edited, and whom it was edited by, conventional systems cannot ensure that edits made to various types of user-created content are facilitated by authorized individuals. At best, content may be digitally signed by an individual after it is edited. However, such a technique does not provide integrity over the course of the content's lifetime. Stated differently, an administrator cannot be sure that only authorized individuals were the ones to make edits to the relevant content article.

As an example of the foregoing, individuals may use their devices to connect to a local network (e.g., by using an approved user profile, etc.) and thereafter view and edit documents and files resident therein. Even if a network has basic security measures (e.g., requiring entry of a username and password combination pair to access the network, etc.), once access is granted the actions performed by the device user are virtually unchecked. Even if an administrator granted a particular user profile permission to edit a documents, conventional solutions are unable to deduce whether any edits made to that document came from an authorized user. For instance, an authorized user may have initially logged into the network using an approved profile but an unauthorized user may subsequent gain access to a particular file via the authorized user's profile (e.g., if the authorized user leaves their device unattended, etc.).

Accordingly, an embodiment provides a method for continuously authenticating a content-editing user. In an embodiment, a sensitivity level of user-created content may first be identified. An embodiment may then determine a type of continuous authentication policy to implement for the user-created content based upon the sensitivity level. When an embodiment detects editing input provided to the user-created content, an embodiment may thereafter authenticate the input-providing user at a frequency that is dictated by the type of continuous authentication policy that is implemented (e.g., a higher frequency for high sensitivity content, a lower frequency for low sensitivity content, etc.). Such a method may ensure that only authorized individuals are the ones that can provide editing input to various types of content.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
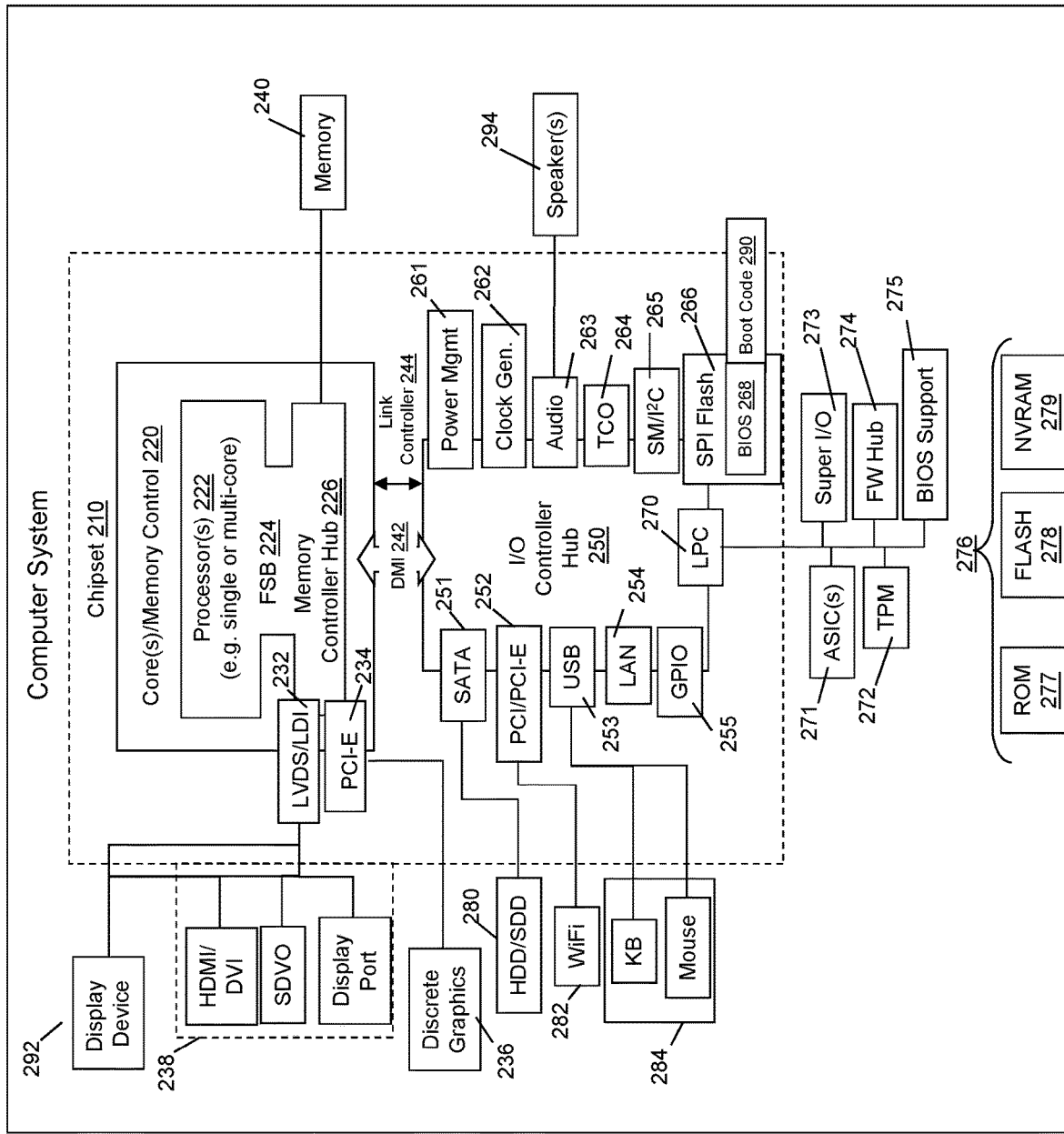
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in devices that may support content-creating applications that users can interact with an edit. For example, the circuitry outlined in FIG. 1 may be implemented in a smart phone or tablet embodiment, whereas the circuitry outlined in FIG. 2 may be implemented in a laptop.

Figure 3:
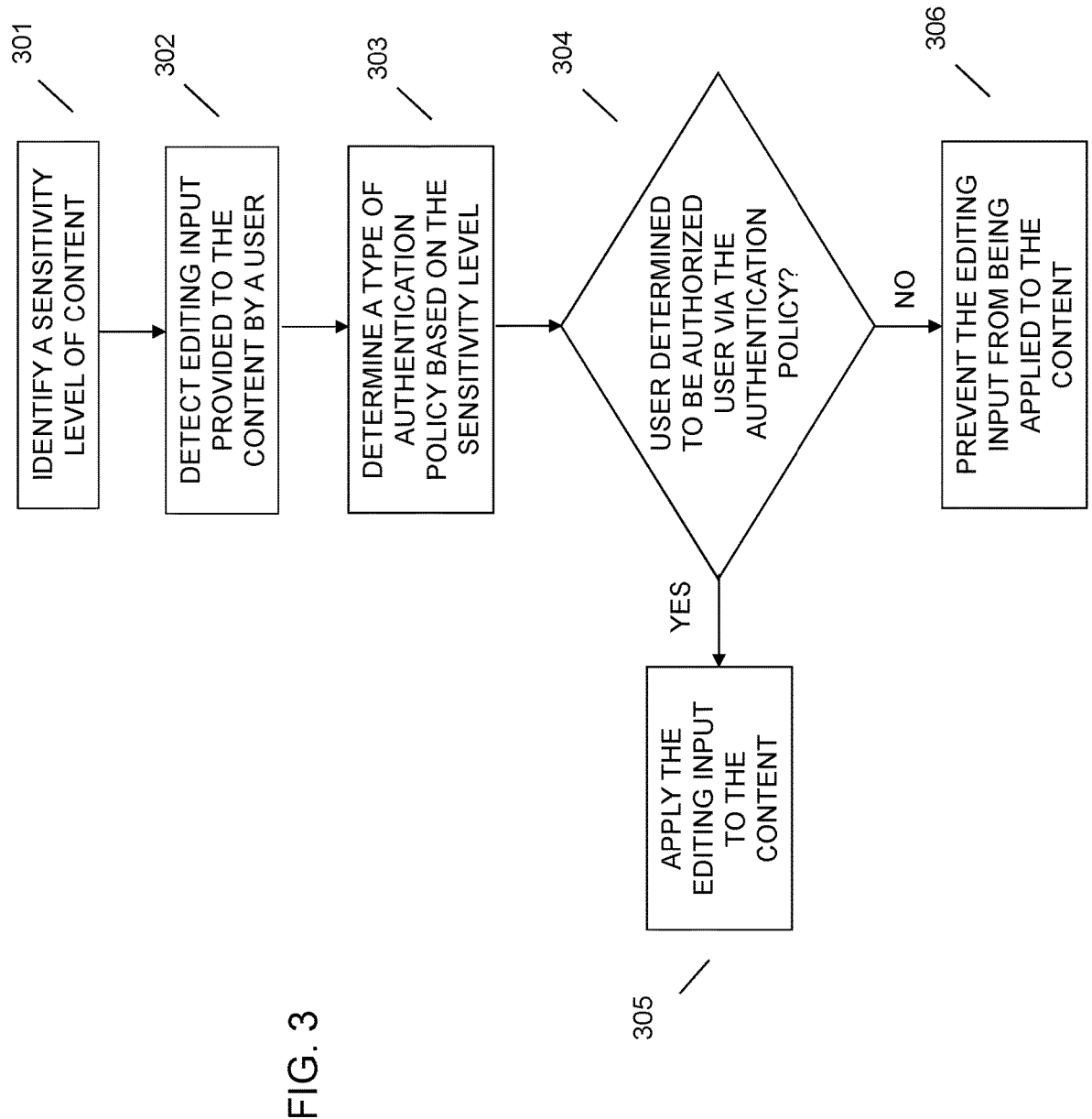
FIG. 3 illustrates an example method of implementing a continuous authentication policy for user-created content.

Referring now to FIG. 3, an embodiment provides a method of implementing a continuous authentication policy for editing inputs made to user-created content. At 301, an embodiment may identify a sensitivity level associated with user-created content. In the context of this application, user-created content may refer to virtually any type of content that can be created by a user. For example, user-created content may encompass: a document created in a word-processing application, a slideshow created in a presentation application, a data table created in a spreadsheet application, audio and/or video content created in a media producing application, other types of files or folders that may be created by a user, etc.

In the context of this application, the sensitivity level may refer to the importance associated with an article of user-created content. For instance, highly sensitive user-created content may correspond to: content that is critical to the work product of an organization, content that is highly personal to an originator or administrator of the content, content that is near a final stage of completion, content that has been created by high status individuals, and the like. Conversely, content having a low sensitivity may correspond to: content that has recently been created, content that is short, content of no or minimal importance to an organization, and the like.

In an embodiment, the sensitivity level may be explicitly assigned by an administrator of the user-created content. In the context of this application, an administrator of the user-created content may be an original creator of the user-created content or may be an individual tasked with overseeing the user-created content. Absent an explicit designation, an embodiment may alternatively assign the sensitivity level to the user-created content dynamically. For example, an embodiment may obtain one or more pieces of contextual data associated with the user-created content (e.g., a topic or context of the content, the identities of the creators of the content, a value of the content to an organization, etc.) and may utilize this contextual data to assign the sensitivity level.

At 302, an embodiment may detect editing input provided by a user that is directed at the user-created content. In the context of this application, editing input may refer to an addition, subtraction, or other type of adjustment (e.g., font change, volume adjustment, brightness adjustment, etc.) made to the user-created content. A user may provide editing inputs to the device via one or more conventional input methodologies (e.g., touch input, stylus input, keyboard and/or mouse input, voice input, gesture input, etc.). These inputs may be detected at one or more corresponding input devices (e.g., a display screen, a stylus, a keyboard, a mouse, a microphone, a camera, etc.).

At 303, an embodiment may determine a type of continuous authentication policy to implement for the user-created content. In the context of this application, a type of continuous authentication policy corresponds to a frequency that an individual interacting with or providing editing inputs to the user-created content is authenticated. For example, an embodiment may authenticate a user a single time (e.g., when an article of user-created content is opened, at some point during an interaction duration of opened user-created content, etc.) or multiple times (e.g., each time a user attempts to make edits to user-created content, multiples times at a predetermined rate during an interaction duration of opened user-created content, etc.).

Additionally or alternatively to the foregoing, the activation of the policy may be facilitated in response to a predetermined event. For example, the continuous authentication policy may simply be activated each time an article of user-created content is opened or each time edits are detected to the user-created content. As another example, if a user, during their interaction with the device, has issues inputting correct passcode information (e.g., the user is unable to enter a correct password in a timely manner or enters the correct password only after multiple failed attempts, etc.) then an embodiment may dynamically initiate the continuous authentication policy for some or all types of user-created content. In yet another example, if the edits the user is making to a particular article of user-created content are identified as "suspicious" (e.g., an embodiment identifies that an edit has deleted a large amount of content in a document, an embodiment identifies that the content created by a high priority individual has been deleted, if the context of the edits is inconsistent with the context of the remainder of the user-created content, etc.).

In an embodiment, the determination of which type of authentication policy to implement may be based upon the sensitivity level of the user-created content. More particularly, the frequency that an individual is authenticated may be directly proportional to the sensitivity level. For example, an individual that interacts with content that has a low sensitivity may only be authenticated once during an editing period (e.g., when the individual opens an article of user-created content, when the individual makes their first edit, etc.). Conversely, an individual that interacts with content that has a high sensitivity may be authenticated multiple times (e.g., multiple times after they have made their first edit to article of user-created content, etc.).

At 304, an embodiment may attempt to authenticate the editing user at a frequency that is dictated by the type of continuous authentication policy that is determined to be implemented. Authentication may occur automatically (e.g., when an article of content is opened, when editing input is detected by an embodiment, etc.) and may not require any additional input or action from the user. More particularly, context data associated with the user, e.g., a user's facial features, a user's voice profile, a user's device interaction methodology (e.g., a user's input speed, input angle, input location, etc.), and the like, may be captured by various sensors (e.g., microphones, cameras, other sensors, etc.) and compared to stored data of authorized users (e.g., where this data is stored locally on the device or remotely on another device or server, etc.). Additionally or alternatively, certain situations may require the user to provide manual input to complete the authentication. For instance, if an embodiment is unable to authenticate an editing user via automatic means, the system may prompt the user to input a correct passcode to confirm their identity as an authorized user. As another example, for content that is highly sensitive, frequent authentication may occur in which some or all of the authentication cycles may require manual user input to be provided.

Responsive to determining, at 304, that a user interacting with the user-created content is an authorized user, an embodiment may, at 305, allow edits made by the authorized user to be applied to the user-created content. Conversely, responsive to determining, at 304, that a user interacting with the user-created content is an unauthorized user, an embodiment may take one or more content protection actions, as further described below.

In an embodiment, a system may simply prevent any edits made by an unauthorized user from being applied to the user-created content. Alternatively, a system may enable the unauthorized user to propose edits to the user-created content but withhold implementing these edits until explicit approval is received from an authorized user. Either of the foregoing actions may be coupled with a notification that is provided to the unauthorized user informing them of the situation. Additionally or alternatively, an indication that an unauthorized user attempted to make edits, or has proposed edits, to the user-created content may be transmitted to an authorized user (e.g., at substantially the time that such a determination is made, etc.) and/or may be saved as metadata and tagged to the user-created content so that an authorized user may be apprised of the situation at a future time (e.g., the next time an authorized user opens the user-created content, etc.).

In an embodiment, as the sensitivity of the user-created content increases, the repercussion intensity may correspondingly also increase. For example, for content that has a low sensitivity, an embodiment may allow edits to be applied or proposed even if an editing user is determined to be an unauthorized user. In another example, for content that has a medium sensitivity, an embodiment may allow a predetermined number of authentication allowances (i.e., an embodiment may allow a user to fail a predetermined number of authentication cycles) prior to preventing them from making edits to the content. In yet another example, for content that has a high sensitivity, an embodiment may prevent a user from editing, or even accessing, the content responsive to determining that they are not an authorized user a single time.

Similar to the concept described in paragraph [0031] above, an embodiment may dynamically elevate the type of continuous authentication policy implemented for all, or a portion of, the user-created content. For instance, if prior user activity on the device, or within the content, is unusual or suspicious (e.g., failed passcode entry attempts, major or uncharacteristic edits made to various portions of user-created content, etc.), an embodiment may categorize this behavior as suspect and may automatically elevate the continuous authentication policy (e.g., an embodiment may increase the frequency of authentication cycles, an embodiment may increase the repercussion intensity, etc.).

The various embodiments described herein thus represent a technical improvement to conventional methods for ensuring that edits made to an article of user-created content are made by authorized individuals. In an embodiment, a sensitivity level associated with user-created content may be identified. Once editing input is detected, an embodiment may determine a type of continuous authentication policy to implement for the user-created content and may thereafter authenticate the editing user at a frequency as dictated by the policy. Such a method may ensure content integrity across user-created content.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   identifying, at an information handling device, a sensitivity level associated with user-created content;
   detecting editing input provided to the user-created content by a user, wherein the editing input comprises an adjustment made to the user-created content, wherein the detecting comprises identifying a predetermined activity performed by the user and wherein the predetermined activity provides one of: accepted editing input and unusual editing input;
   determining, using a processor, a type of continuous authentication policy to implement for the user-created content based upon the sensitivity level, wherein the type of continuous authentication policy corresponds to a frequency that the user is authenticated while interacting with the user-created content, wherein the determining comprises dynamically elevating the type of continuous authentication policy for at least a portion of the user-created content subsequent to determining the predetermined activity performed by the user is unusual editing input; and authenticating, responsive to determining the predetermined activity provides accepted editing input, the user providing the editing input at a frequency dictated by the type of the continuous authentication policy, wherein the authenticating comprises receiving approval from a previously authenticated user that the unusual editing input present is accepted editing input.

2. The method of claim 1, wherein the determining comprises dynamically activating the type of the continuous authentication policy in response to identification of a predetermined event.

3. The method of claim 1, wherein the authenticating comprises automatically authenticating the user utilizing context data obtained from the user by at least one sensor coupled to the information handling device.

4. The method of claim 1, wherein the frequency for authenticating the user is directly proportional to the sensitivity of the user-created content.

5. The method of claim 1, further comprising ascertaining, via the continuous authentication policy, that the user is not authorized to provide the editing input to the user-created content.

6. The method of claim 5, further comprising preventing, responsive to the ascertaining, the editing input from being applied to the user-created content.

7. The method of claim 6, wherein the preventing comprises:
placing the editing input into a queue;
detecting that authorization for the editing input in the queue has been approved by an administrator of the user-created content; and
applying, responsive to the detecting, the editing input to the user-created content.

8. The method of claim 5, further comprising tagging metadata of the ascertaining to the user-created content, wherein the metadata contains an indication of the user and a result of the ascertaining.

9. The method of claim 5, further comprising providing an alert notification to an authorized user of the ascertaining.

10. An information handling device, comprising:
a processor;
a memory device that stores instructions executable by the processor to:
identify a sensitivity level associated with user-created content;
detect editing input provided to the user-created content by a user, wherein the detecting comprises identifying a predetermined activity performed by the user and wherein the predetermined activity provides one of: accepted editing input and unusual editing input;
determine a type of continuous authentication policy to implement for the user-created content based upon the sensitivity level, wherein the determining comprises dynamically elevating the type of continuous authentication policy for at least a portion of the user-created content subsequent to determining the predetermined activity performed by the user is unusual editing input; and
authenticate, responsive to determining the predetermined activity provides accepted editing input, the user providing the editing input at a frequency dictated by the type of the continuous authentication policy, wherein the frequency for authenticating the user is directly proportional to the sensitivity of the document, wherein the authenticating comprises receiving approval from a previously authenticated user that the unusual editing input present is accepted editing input.

11. The information handling device of claim 10, wherein the instructions executable by the processor to determine comprise instructions executable by the processor to dynamically activate the type of the continuous authentication policy in response to identification of a predetermined event.

12. The information handling device of claim 10, wherein the instructions executable by the processor to authenticate comprise instructions executable by the processor to automatically authenticate the user utilizing context data obtained from the user by at least one sensor coupled to the information handling device.

13. The information handling device of claim 10, wherein the frequency for authenticating the user is directly proportional to the sensitivity of the document.

14. The information handling device of claim 10, wherein the instructions are further executable by the processor to ascertain, via the continuous authentication policy, that the user is not authorized to provide the editing input to the user-created content.

15. The information handling device of claim 14, wherein the instructions are further executable by the processor to prevent, responsive to the ascertaining, the editing input from being applied to the document.

16. The information handling device of claim 14, wherein the instructions executable by the processor to prevent comprise instructions executable by the processor to:
place the editing input into a queue;
detect that authorization for the editing input in the queue has been approved by an administrator of the document; and
apply, responsive to the detecting, the editing input to the user-created content.

17. The information handling device of claim 14, wherein the instructions are further executable by the processor to tag metadata associated with the ascertaining to the user-created content, wherein the metadata contains an indication of the user and a result of the ascertaining.

18. A product, comprising:
a storage device that stores code, the code being executable by a processor and comprising:
code that identifies a sensitivity level associated with user-created content;
code that detects editing input provided to the user-created content by a user wherein the code that detects comprises identifying a predetermined activity performed by the user and wherein the predetermined activity provides one of: accepted editing input and unusual editing input;
code that determines a type of continuous authentication policy to implement for the user-created content based upon the sensitivity level, wherein the code that determines comprises dynamically elevating the type of continuous authentication policy for at least a portion of the user-created content subsequent to determining the predetermined activity performed by the user is unusual editing input; and
code that authenticates, responsive to determining the predetermined activity provides accepted editing input, the user providing the editing input at a frequency dictated by the type of the continuous authentication policy, wherein the frequency for authenticating the user is directly proportional to the sensitivity of the document, wherein the code that authenticates comprises receiving approval from a previously authenticated user that the unusual editing input present is accepted editing input.

* * * * *